June 5, 1962  J. L. BOWER  3,037,286
VECTOR GAGE

Original Filed Jan. 28, 1957  7 Sheets-Sheet 1

INVENTOR.
JOHN L. BOWER
BY
*Allan Rothenberg*
ATTORNEY

June 5, 1962  J. L. BOWER  3,037,286
VECTOR GAGE

Original Filed Jan. 28, 1957  7 Sheets-Sheet 2

INVENTOR.
JOHN L. BOWER
BY
*Allan Rothenberg*
ATTORNEY

June 5, 1962  J. L. BOWER  3,037,286
VECTOR GAGE

Original Filed Jan. 28, 1957  7 Sheets-Sheet 3

INVENTOR.
JOHN L. BOWER
BY Allan Rothenberg
ATTORNEY

June 5, 1962 J. L. BOWER 3,037,286
VECTOR GAGE
Original Filed Jan. 28, 1957 7 Sheets-Sheet 4

INVENTOR.
JOHN L. BOWER
BY
*Allen Rothenberg*
ATTORNEY

June 5, 1962

J. L. BOWER 3,037,286

VECTOR GAGE

Original Filed Jan. 28, 1957

INVENTOR.
JOHN L. BOWER

BY

ATTORNEY

June 5, 1962 J. L. BOWER 3,037,286
VECTOR GAGE

Original Filed Jan. 28, 1957 7 Sheets-Sheet 6

*INVENTOR*
JOHN L. BOWER
BY
Allen Rothenberg
ATTORNEY

INVENTOR.
JOHN L. BOWER

United States Patent Office 3,037,286
Patented June 5, 1962

3,037,286
VECTOR GAGE
John L. Bower, Downey, Calif., assignor to
North American Aviation, Inc.
Original application Jan. 28, 1957, Ser. No. 636,535, now
Patent No. 2,906,179, dated Sept. 29, 1959. Divided
and this application Oct. 23, 1958, Ser. No. 771,698
8 Claims. (Cl. 33—1)

This invention relates to vector gages and particularly to a gage adapted to indicate the position of a point relative to a preselected reference point.

This application is a division of my application Serial No. 636,535, filed January 28, 1957, now Patent No. 2,906,179.

It is frequently desirable in machine tool operations to determine the position of a point accurately on a workpiece relative to some preselected reference point on the machine tool. Since the point, whose position is to be determined, is often located in a position which is not readily accessible from the reference point by ordinary measuring devices, it is desirable to produce a flexible relative position indicator. A device, which measures the coordinates of a point on a probe which, in turn, can be placed against the point on the workpiece with great flexibility, has numerous uses in machine tool operation. Thus for inspection of a part having complex surfaces, it is convenient to be able to touch any point on the surface of the part with a probe and obtain an immediate numerical indication of its coordinates relative to some fixed reference point. A gage of this type can also be used to indicate the instantaneous position of the cutting edge of a machine tool. By appropriate circuitry it can be used to compare this position with a programmed machining schedule. Appropriately positioned servo motors can then be actuated in response to the positioning error in a manner to position the tools accurately. The origin or point of reference might be any point, either on or off the workpiece.

It is therefore an object of this invention to provide a flexible vector gage useful for accurately indicating the vector position of a point relative to a reference point.

It is another object of this invention to provide an improved vector gage for continuously indicating the relative positions of two points utilizing a continuous flexible linkage system interconnecting the two points, means for generating signals proportional to a vector representation of each link in the linkage system and a computer adapted to resolve the individual vectors of the links into signals proportional to the vector representation of a line joining the two points.

It is a further object of this invention to provide a vector gage for indicating the relative position of two points comprising a continuous flexible linkage system joining said two points; means for indicating the vector representation of each link of said linkage system relative to the next preceding link; means for indicating the vector representation of the first link in said linkage system relative to a preselected coordinate system; and means for resolving said vector representations of said first-named vector indicating means into indications of the vector representations relative to said preselected coordinate system and vectorially summing all of said indications of said vectors.

It is another object of this invention to provide an improved gage for measuring the relative positions of two points comprising a flexible linkage system connecting said two points, means for generating signals proportional to the angular bearings and lengths of the individual links in said system, and computer means responsive to said signal generating means for resolving said angular bearings and lengths of said individual links into outputs proportional to the vector position of one of said points relative to the other.

It is another object of this invention to provide an improved vector gage for measuring the position of a point relative to a reference point, utilizing a plurality of links pivotally connected in series; means for pivotally supporting the free end of the link at one end of said series linkage system at said reference point, angle measuring means positioned to measure the bearing of said link connected to said reference point relative to a plurality of reference coordinate axes intersecting at said reference point, angle measuring means producing a signal output proportional to the bearings of successive links in said series linkage system relative to each other; and means responsive to the signal outputs of said bearing measuring means for resolving the lengths of each of said series of links in a manner to produce a vector indication relative to said reference point of the free end of the other end link of said linkage system.

Other objects of invention will become apparent from the following description taken in connection with the accompanying drawings, in which FIG. 1 is a perspective view of a preferred embodiment of the flexible vector gage contemplated by this invention;

Figure 11:
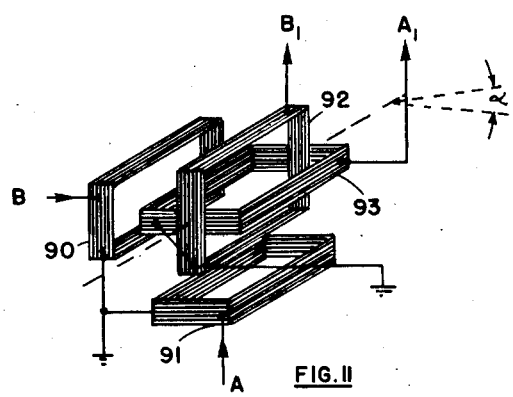
Figure 10:
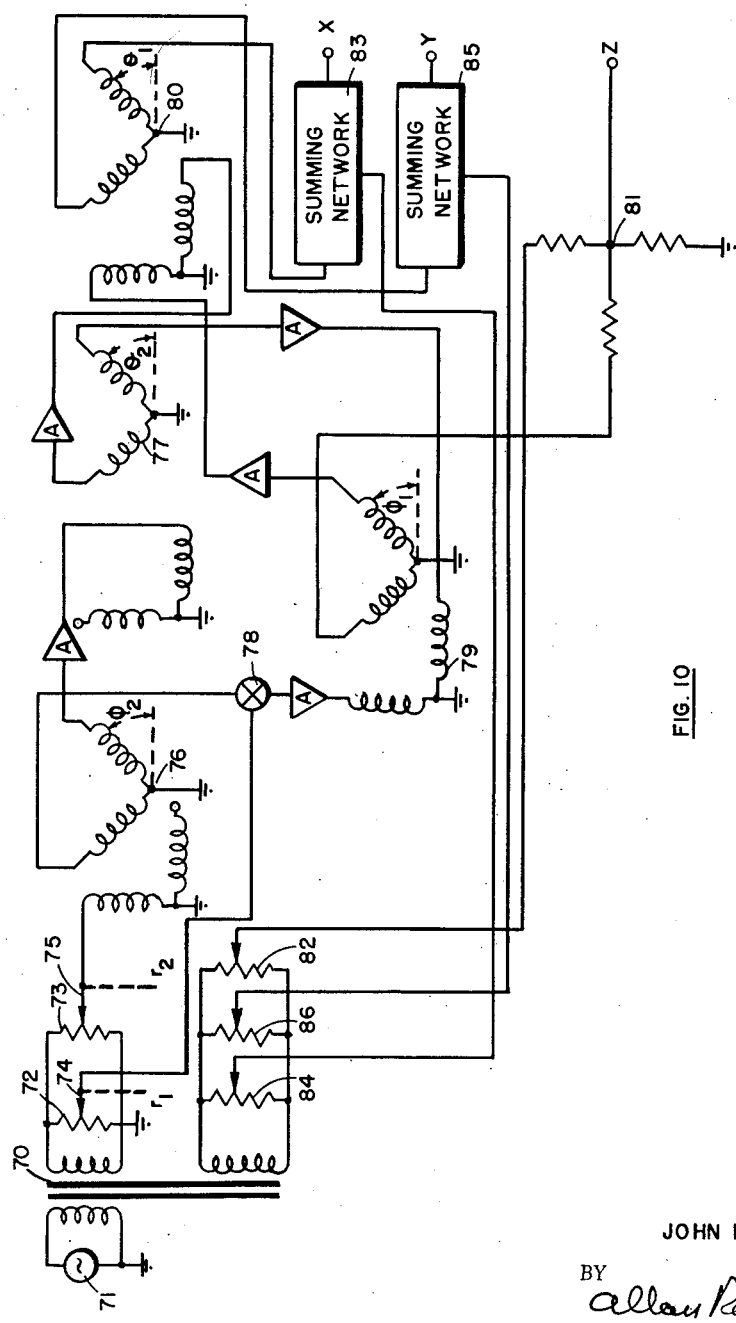
FIG. 10 is a schematic drawing of a typical computer utilized to convert the angle and distance measurements of the vector gage of FIG. 1 into three orthogonal coordinates.

And FIG. 11 is a schematic drawing of a typical resolver utilized in the computer of FIG. 10.

Figure 1:
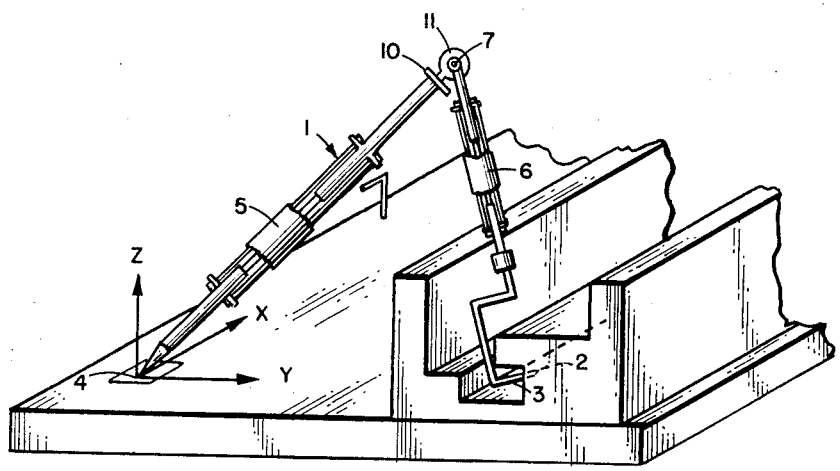
Figure 3:
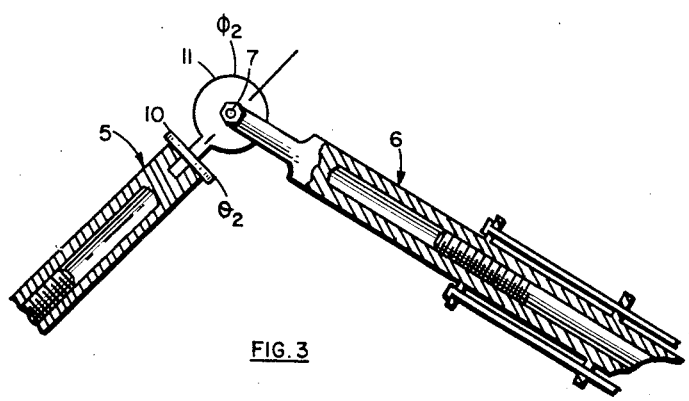
FIG. 3 is a section view of the pivotal connection between the two links of the vector gage of FIG. 1.
Figure 2:
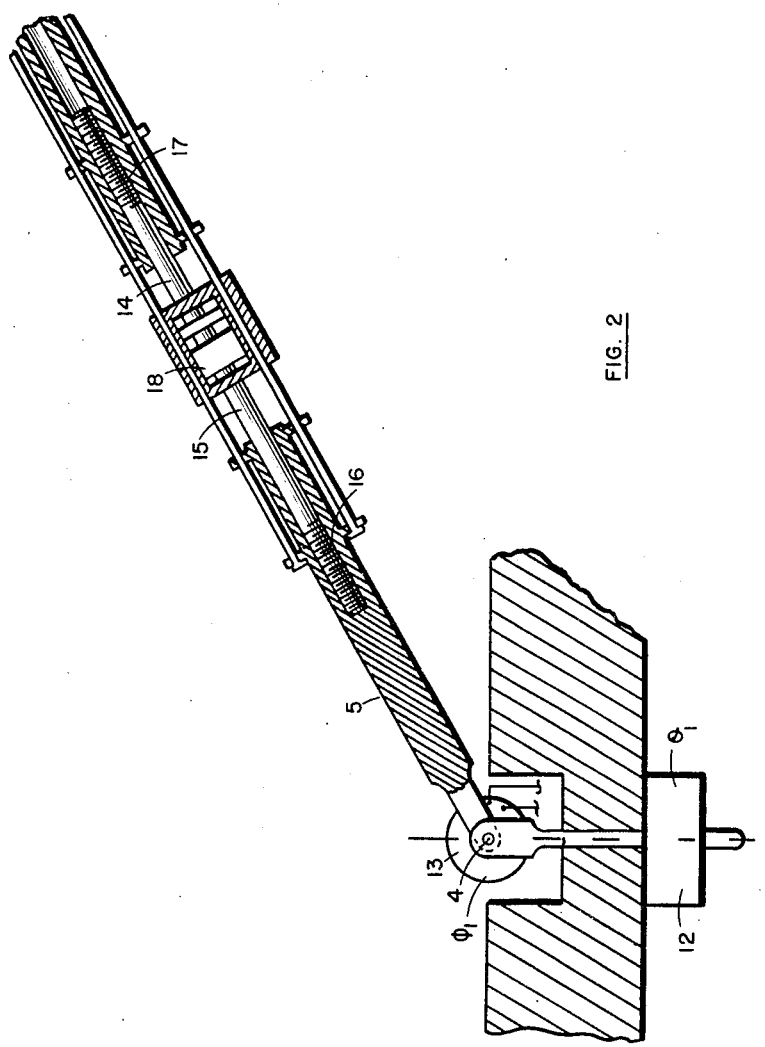
FIG. 2 is a section view of the first link of the vector gage of FIG. 1 showing a typical pivotal support for one end of a link at a reference point.

Referring now to FIG. 1, a vector gage 1 is utilized to determine the relative position of end point 2 of probe 3 relative to reference point 4. Vector gage 1 consists of two links 5 and 6, pivotally coupled together at common terminal 7. One end of link 5 is pivotally supported at reference point 4. Probe 3 is attached to the free end of link 6. It is desired instantaneously and accurately to convert a vector running from point 4 to point 2 into distances along orthogonal X, Y and Z coordinate axes which intersect at the point 4. As is readily apparent from the configuration of FIG. 1, a direct measurement by conventional means of the X, Y and Z components of point 2 is not easily accomplished. By utilizing a highly flexible linkage system illustrated in FIG. 5, it is possible to resolve the desired vector into two or more component vectors, the coordinates of which are readily obtainable. Consider the axis of link 5 as the line joining point 4 and point 7, while the axis of link 6 is the line joining point 7 and point 2. The axis of link 5 intersects the vertical and horizontal pivot axes of the link 5 at the point 4. Likewise the effective axis of the link 6 is a line 2—7, which intersects the axis of the link 5 and the axis transverse to the link 5, with respect to which the link 6 is pivoted to the link 5 at the point 7. To achieve pivoting of the link 6 around the link 5, the latter may be rotatably mounted in a socket 9. The axes of links 5 and 6 form vectors, the resultant of which is a vector from point 4 to point 2. Appropriately positioned resolvers can readily produce an accurate indication of the bearing of the axis of link 5 relative to the X, Y and Z coordinate axes. A second set of resolvers positioned near common terminal 7 of the links 5 and 6 can also produce an accurate indication of the bearing of the axis of link 6 relative to a set of coordinates having a fixed positional relationship with respect to the axis of link 5. For additional flexibility, the lengths of links 5 and 6 may be made adjustable as illustrated in FIGS. 2 and 3.

Figure 4:
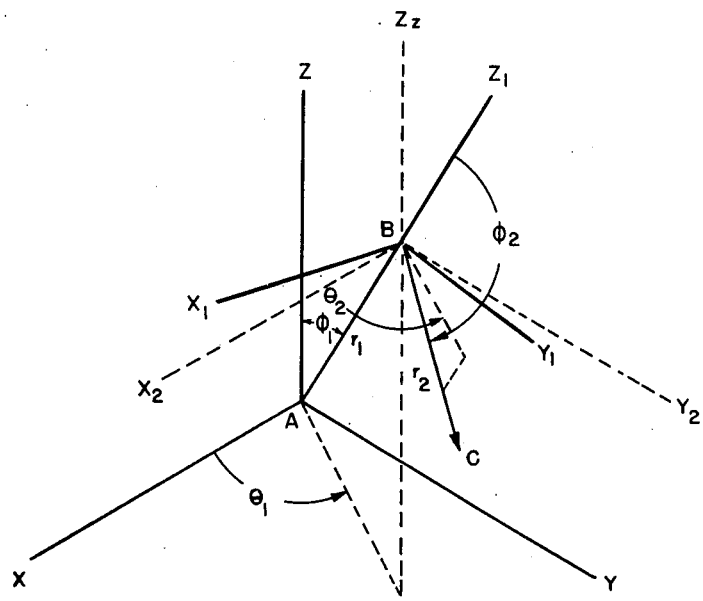
FIG. 4 is a vector diagram of the linkage system of FIG. 1 showing the angles and distances measured by the preferred embodiment of this invention.

Referring now to FIG. 4, a vector indication of the two vectors utilized in the preferred embodiment of this invention as component parts of the desired vector is shown. In the representation of FIG. 4, point A is synonymous with point 4, point B is synonymous with point 7, and point C is synonymous with point 2 of FIG. 1. The length of the vector from point A to point B is $r_1$. The length of the vector from point B to point C is $r_2$. The angular bearing of any vector relative to the three coordinate axes can be fixed in space by the measurement of two angles. Thus, the bearing of the vector AB is fixed relative to the X, Y, Z coordinate axes by angles $\phi_1$ and $\theta_1$, where $\phi_1$ represents the declination of the link 5 or the angle between the Z axis and the vector AB and $\theta_1$ represents the azimuth of the link 5 or the angle between its projection on the plane XY and X axis.

A second set of reference axes having a fixed positional relationship to the vector AB are shown as orthogonal axes $X_1$, $Y_1$, and $Z_1$ which intersect at the point 7. For simplicity the axis $Z_1$ is defined as an extension of the vector AB, axis $X_1$ is selected normal to the $Z_1$ axis and is the plane formed by the vector AB and the Z axis, and the axis $Y_1$ is normal to both axes $Y_1$ and $Z_1$.

The bearing of the vector BC relative to the $X_1$, $Y_1$ and $Z_1$ axes is determined by the angles $\phi_2$ and $\theta_2$ where $\phi_2$ is the angle between the axis $Z_1$ and the vector BC and $\theta_2$ is the angle between the $X_1$ axis and the projection of the vector BC on the plane of the axes $X_1$ and $Y_1$.

Figure 5:
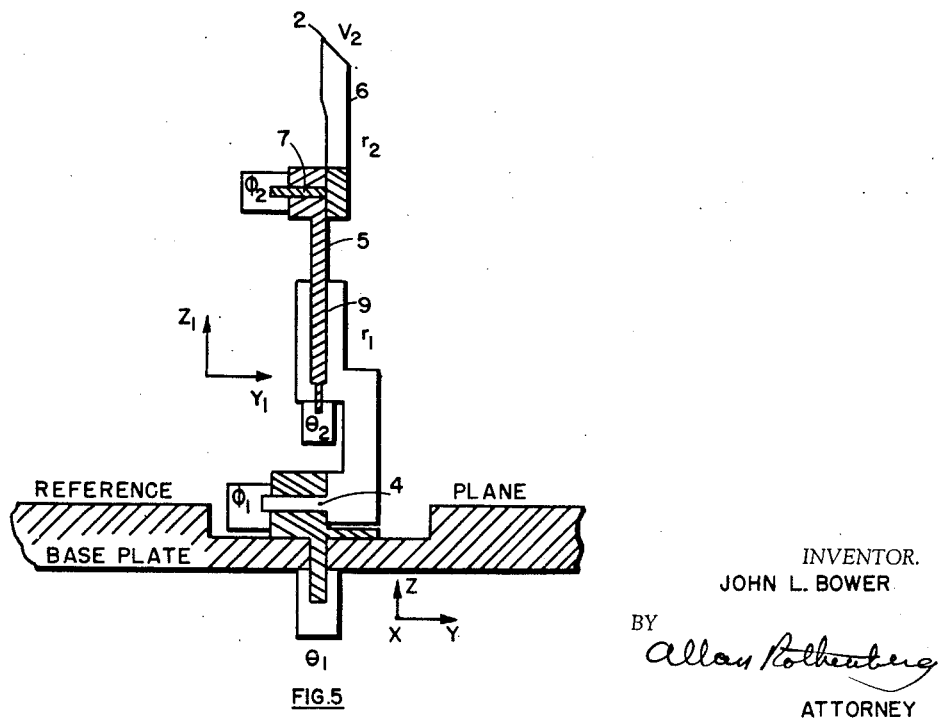
FIG. 5 is a sectional view of an illustrative construction for mounting gage links with a suitable pivot arrangement.

Referring to FIG. 5 the apparatus is illustrated in a position wherein the $Y_1$ axis extends through the intersection of the axis of the $\theta_2$ hinge and links 5 and 6 and is parallel to the axis of the $\phi_1$ hinge.

It will be observed that the hinge axes of the angles $\theta_1$, $\phi_1$ and $\theta_2$ intersect in the reference plane XY at the origin of the XYZ coordinate system. The axis of the $\theta_2$ hinge intersects that of the $\phi_1$ hinge and is normal to it. The $\phi_1$ axis lies in the reference plane, normal to the $\theta_1$ axis.

It is desired to resolve the sum of the vector AB and the vector BC into distances measured along the X, Y and Z axes. In order to accomplish this resolution, it is necessary to combine in a predeterminable fundamental relationship the instantaneous values of the angles $\phi_1$, $\phi_2$, $\theta_1$, and $\theta_2$ and distances $r_1$ and $r_2$.

The vector addition is facilitated by assuming a transposition of axes. Referring to FIG. 4, axes $X_2$, $Y_2$ and $Z_2$ are shown having an origin at point B respectively parallel to the axes X, Y and Z. Both sets of axes are mutually orthogonal axes. Let the coordinates of the point B with respect to the axes X, Y and Z, be $\Delta x$, $\Delta y$, and $\Delta z$, respectively, and the coordinates of the point C with respect to the axes $X_2$, $Y_2$ and $Z_2$ be $\Delta x_2$, $\Delta y_2$ and $\Delta z_2$, respectively. Then with respect to the axes X, Y and Z, the coordinates of the point C are respectively $$X = \Delta x + \Delta x_2$$
$$Y = \Delta y + \Delta y_2$$
$$Z = \Delta z + \Delta z_2$$

The coordinates of the point B in terms of the distance, $r_1$, of the point B from the point A and angles $\phi_1$ and $\theta_1$ are $$\Delta x = r_1 \sin \phi_1 \cos \theta_1$$
$$\Delta y = r_1 \sin \phi_1 \sin \theta_1$$
$$\Delta z = r_1 \cos \phi_1$$

The coordinates of the point C in terms of distances $r_1$ and $r_2$ and angles $\phi_1$, $\phi_2$, $\theta_1$ and $\theta_2$ are more complex but are obtainable by utilizing a transformation of coordinates in three dimensions.

The coordinates of the point C in relation to the $X_1$, $Y_1$, $Z_1$ axes and in terms of the distance $r_2$ of the point C from the point B, and angles $\phi_2$ and $\theta_2$ are $$x_1 = r_2 \sin \phi_2 \cos \theta_2$$
$$y_1 = r_2 \sin \phi_2 \sin \theta_2$$
$$z_1 = r_2 \cos \phi_2$$

These values are translated to the X, Y, Z axes and added to the values of the coordinates of the point B in terms of $r_1$, $\phi_1$ and $\theta_1$.

Employing the methods of trigonometry the following formulae for the coordinates of the point C are obtained $$x = r_1 \sin \phi_1 \sin \theta_1 + r_2 (\cos \phi_1 \sin \theta_1 \sin \phi_2 \cos \theta_2 \\ -\cos \theta_1 \sin \phi_2 \sin \theta_2 + \sin \phi_1 \sin \theta_1 \cos \phi_2) \quad (1)$$
$$y = r_1 \sin \phi_1 \cos \theta_1 + r_2 (\cos \phi_1 \cos \theta_1 \sin \phi_2 \cos \theta_2 \\ + \sin \theta_1 \sin \phi_2 \sin \theta_2 + \sin \phi_1 \cos \theta_1 \cos \phi_2) \quad (2)$$
$$z = r_1 \cos \phi_1 + r_2 (\cos \phi_1 \cos \phi_2 - \sin \phi_1 \sin \phi_2 \cos \theta_2) \quad (3)$$

From the foregoing, it is readily apparent that the X, Y and Z coordinates of point 2 can be obtained utilizing predetermined functions of distances $r_1$ and $r_2$ and angles $\phi_1$, $\theta_1$, $\phi_2$ and $\theta_2$. Therefore, by producing signal outputs which are proportional to the distances and angles and coupling these signals into a properly designed computer, an output indication of the X, Y and Z coordinates of point 2 is continuously obtained. Since these coordinates collectively express the spatial position of point C relative to origin of the coordinate system, it may be appreciated that an expression of such coordinates constitutes an expression of the resultant vector AC.

Referring now to FIGS. 1, 2 and 3, a typical flexible linkage system for the vector gage contemplated by this invention is shown. In linkage system 1, lever arms 5 and 6 have adjustable lengths corresponding to distances $r_1$ and $r_2$, respectively. Links 5 and 6 are pivotally connected together at point 7. Resolvers 10 and 11 produce signal outputs which are proportional to trigonometric functions of $\theta_2$ and $\phi_2$, respectively. The lower end of link 5 is pivotall supported at fixed reference point 4, by a suitable mounting such as shown more clearly in FIG. 2. Resolvers 12 and 13 continuously produce signal outputs which are proportional to trigonometric functions of angles $\theta_1$ and $\phi_1$, respectively. Resolvers of a suitable type are provided also for producing signal outputs proportional to the lengths $r_1$ and $r_2$ of links 5 and 6. Such link lengths may be measured very precisely without the aid of screws by employing digital computer gage elements of the magnetic grid-counting type described in the copending application of John L. Bower and Wilton R. Abbott, Serial No. 519,602, filed July 1, 1955, now patent number 2,875,524 or the optical grid-counting type described in the copending application of John L. Bower and Wilton R. Abbott, Serial No. 520,086 filed July 5, 1955.

In FIGS. 1, 2 and 3, for simplicity in the drawing, the links or arms 5 and 6 are illustrated as being extensible with schematically represented length resolvers. As shown in FIG. 2, the link 5 includes longitudinally separable shafts 14 and 15 secured in the ends of the link 5 in any suitable manner as by threads 16 and 17. An indicator or resolver 18 for indicating change in length of link 5 is represented schematically. The counter or indicator 18 produces a signal output proportional to length $r_1$. Link 6 is provided with a similar means for measuring its length.

Figure 6:
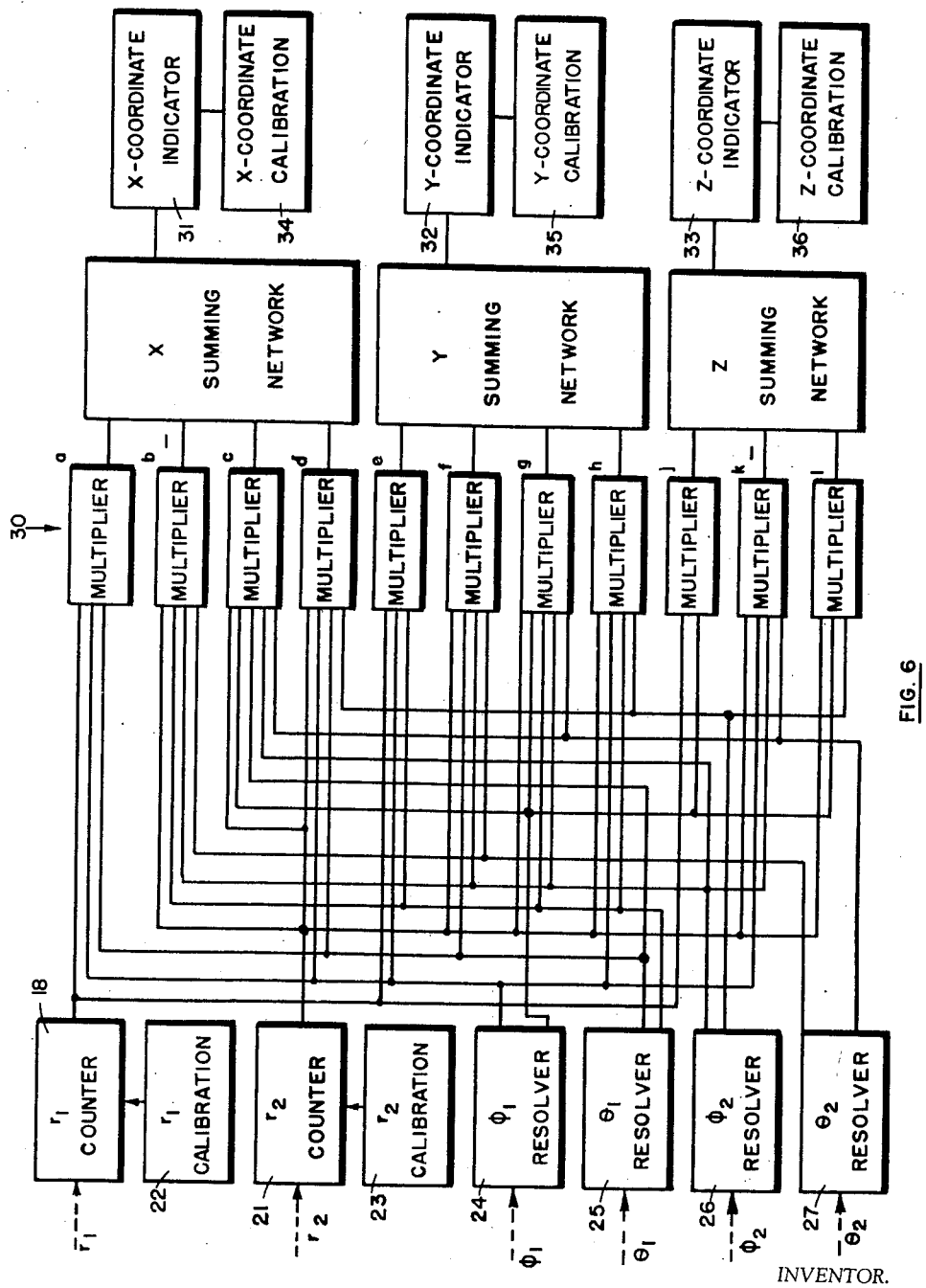
FIG. 6 is a block diagram of an electronic circuit utilized with the vector gage of FIG. 1.

Referring now to FIG. 6, there is shown in block diagram an electronic circuit utilized to convert the length and angle measurements of the system of FIG. 1 into a coordinate indication of the vector sum of the link vectors. The indicator 18 produces a signal output which is proportional to length $r_1$ from point 4 to point 7 in FIG. 1. Indicator 21 is sensitive to changes in length of link 6 and produces an output signal which is proportional to length $r_2$ from point 7 to point 2. If length indicators of the grid-counting type are employed digital output signals will be obtained. The outputs of counters 18 and 21 may be reset by utilizing independent sources of calibration 22 and 23.

The movement of link 5 from a position of coincidence with the Z axis actuates $\phi_1$ resolver 24, which produces signal outputs proportional to the sine and cosine of angle $\phi_1$. The movement of link 5 about the Z axis actuates $\theta_1$ resolver 25 to produce signal outputs proportional to the sine and cosine of angle $\theta_1$. Angle $\theta_1$ is the angle between the projection of the axis of link 5 on the X—Y plane and the Y axis. The movement of link 6 from coincidence with an extension of link 5 actuates $\phi_2$ resolver 26 to produce signal outputs proportional to the sine and cosine of $\phi_2$. The movement of link 6 from coincidence with the plane defined by the Z axis and link 5 actuates $\theta_2$ resolver 27 to produce signal outputs proportional to the sine and cosine of angle $\theta_2$. The signal outputs from counters 18 and 21 and resolvers 24—27 are coupled into computer 30 where they are combined by conventional multiplying and summing networks in compliance with the equations previously given to produce output signals proportional to the X, Y and Z coordinates of point 2. X-coordinate indicator 31, Y-coordinate indicator 32 and Z-coordinate indicator 33 convert these signal outputs into a visual indication, preferably in numerical form, of the $x$, $y$ and $z$ coordinates. For purposes to be described later, calibration circuits 34, 35 and 36 are provided to change by predetermined amounts the readings of indicators 31, 32 and 33, respectively.

Figure 7:
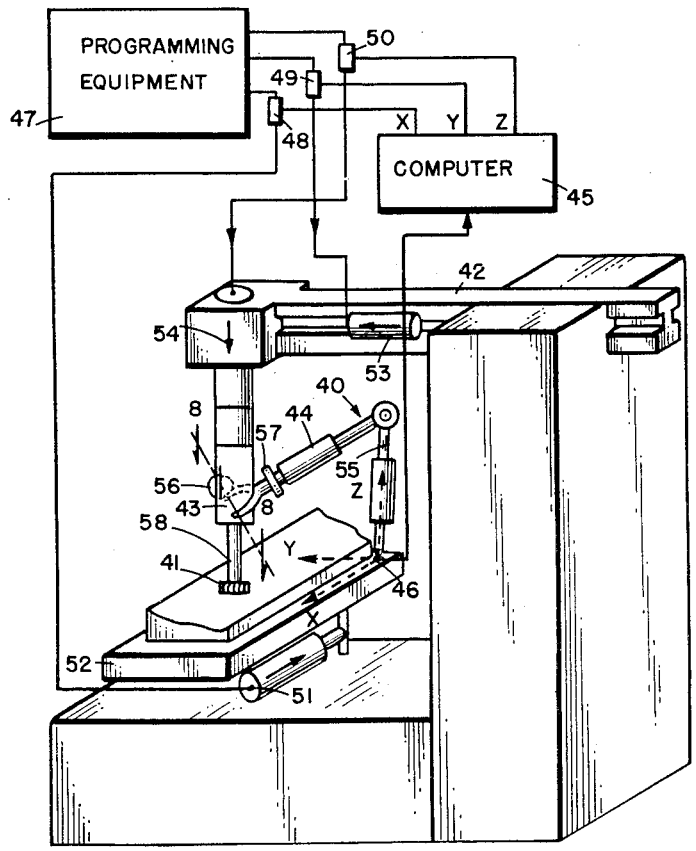
FIG. 7 is a perspective view of an alternative use for the vector gage contemplated by this invention.
Figure 8:
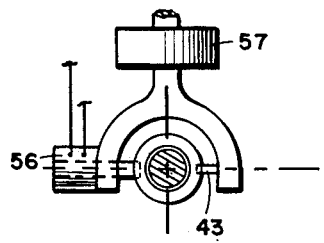
FIG. 8 is a section view of the flexible connection of the vector gage to the machine tool taken along the line 8—8 of FIG. 7.

Referring now to FIGS. 7 and 8, an alternate use for the vector gage contemplated by this invention is shown. In this embodiment, a vector gage 40 is utilized to determine continuously the exact position of cutting edge 41 of machine tool 42. It is to be noted that vector gage 40 is connected to measure the position of point 43 which is a predetermined distance above and to the right of cutting edge 41 in FIG. 7. Thus, the free end of adjustable link 44 of vector gage 40 is pivotally connected to machine tool 42 at point 43. The signal outputs of the angle and distance measuring devices of vector gage 40 are coupled into computer 45. Computer 45 produces signal outputs which are proportional to the X, Y and Z coordinates of point 43 relative to point 46. To compensate for the offset position of point 43 relative to cutting edge 41, X, Y, and Z calibration units similar to those described in connection with FIG. 6, are incorporated into computer 45. These units change the outputs of the multiplying and summing channels by predetermined amounts proportional to the magnitude of off-set in the Y and Z directions of point 43 relative to cutting edge 41. The actual output signals of computer 45 are, therefore, accurate indications of the X, Y and Z coordinates of cutting edge 41.

Machine tool programming equipment 47 produces signal outputs which are proportional to a desired position, $X_o$, $Y_o$ and $Z_o$, of cutting edge 41. The signal outputs are varied in a programmed manner to indicate a desired movement of cutting edge 41. These signal outputs are coupled into comparison networks 48, 49 and 50 where they are compared with the instantaneous signal outputs from computer 45. Comparator 48 produces an output voltage which is proportional to the deviation of the instantaneous position of cutting edge 41 in the X direction from coincidence with the desired position indicated by the output of programming equipment 47. This signal output is connected to motor 51 which drives bed 52 along the X axis in a direction and magnitude sufficient to reduce the $x$ error to zero. Similarly, the output signal from comparator 49 actuates motor 53 to drive the cutting tool along the Y axis in a direction and magnitude sufficient to reduce the $y$ error signal to zero. The output signal from comparator 50 actuates motor 54 to drive the cutting tool along the Z axis in a direction and magnitude sufficient to reduce the $z$ error signal to zero.

In order to take into consideration any failure of the shaft of the cutting tool 41 to move with perfect perpendicularity or to travel linearly in the head of the machine 42, resulting from wear or misalignment of the mounting, additional resolvers are preferably provided so that there is constructed in effect a 3-link vector gage based upon the operating principles described, in which the third link is the section 58 of the tool from the point of attachment 43 down to the center of the cutting surface 41. Additional angle resolvers 56 and 57 for angles $\phi_3$ and $\theta_3$ may be provided and a constant signal may be introduced to represent a fixed length $r_3$ constituting the third link.

Figure 9:
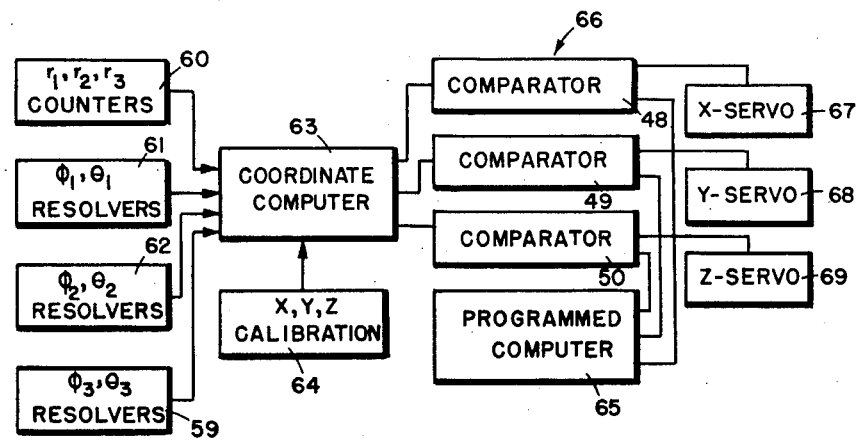
FIG. 9 is a block diagram of an electronic circuit utilized with the machine tool control shown in FIG. 7.

Referring now to FIG. 9, a block diagram of the electronic circuit utilized with the machine tool of FIG. 7 is shown. Counters 60 generate electric signals proportional to the lengths, $r_1$, $r_2$ and $r_3$, of links 44, 55 and 58 of vector gage 40. Resolvers 61 produce electric signals proportional to the angles $\phi_1$ and $\theta_1$, indicative of the instantaneous bearing of lever 55 relative to the X, Y and Z coordinates. Resolvers 62 produce electric signals proportional to angles $\phi_2$ and $\theta_2$ indicative of the instantaneous bearing of lever 44 relative to lever 55. Resolvers 59 produce electric signals proportional to angles $\phi_3$ and $\theta_3$, indicative of the instantaneous bearing of the link 58 relative to the lever 44. These signals are coupled in the coordinate computer 63 which is also subjected to calibration signals from X, Y and Z calibration unit 64 in a manner to generate signal outputs proportional to the X, Y and Z coordinates of cutting edge 41. Programmed computer 65 produces in a programmed manner output signals proportional to the desired X, Y and Z coordinates of cutting edge 41. Comparator assembly 66 including the comparators 48, 49, 50 compares the two input signals and produces signal outputs proportional to the positional error of cutting edge 41. These error signals are coupled to servos 67, 68 and 69 which move the workpiece relative to cutting tool in a manner to reduce the positional errors to zero.

Referring now to FIG. 10, a schematic drawing of a typical coordinate computer for a two-link system is shown. The primary of transformer 70 is subjected to a constant magnitude alternating current from source 71. Potentiometers 72 and 73 are connected across a secondary of transformer 70. Wiper 74 on potentiometer 72 is positioned at a point determined by the length of the first link of the vector gage. Wiper 75 is positioned at a point determined by the length of the second link of the vector gage. The magnitudes of the signals picked off by wipers 74 and 75 are, therefore, proportional to the lengths $r_1$ and $r_2$, respectively. It will be understood that if grid-counting length indicators are utilized for the links 5 and 6, suitable digital-to-analog converting apparatus is employed for actuating the potentiometer wipers 74 and 75.

A typical electromagnetic resolver used to resolve the companents of a vector from one set of axes to another set in the same plane is shown in FIG. 11. In FIG. 11 windings 90 and 91 are stator windings, while windings 92 and 93 are rotor windings. The relative angle between the stator and rotor windings is designated by the angle $\alpha$. Under these conditions and assuming coil 91 is subjected to signal "$a$," and coil 90 is subject to signal "$b$," the output signals $a'$ and $b'$ of the resolver are represented by the following formulae:

$$a' = a \cos \alpha = b \sin \alpha$$
$$b' = b \cos \alpha - a \sin \alpha$$

Referring once again to FIG. 10, the potential picked off by wiper 75 is connected to the "b" stator winding of resolver 76. The rotor of resolver 76 is positioned in response to angle $\phi_2$ of FIG 1. The $b'$ output signal from resolver 76 is coupled to summing network 78, while the $a'$ output signal is connected to the "a" winding of resolver 77. Summing network 78 is also subjected to signal from wiper 74 proportional to length $r_1$. The output of summing network 78 is coupled to the "b" winding of resolver 79. The "a" winding of resolver 79 is connected to the $a'$ output of resolver 77 whose rotor is positioned in accordance with the angle $\theta_2$. The rotor of resolver 79 is positioned in response to the angle $\phi_1$. The $b'$ output of resolver 79 is a signal proportional to the Z coordinate of the free end of the vector gage, in accordance with the Formula 3. If necessary, this output can be compensated for an offset by utilizing summing network 81 which is also subjected to a signal from potentiometer 82 which is proportional to the Z offset.

The $a'$ output of resolver 79 is connected to the "b" winding of resolver 80. The "a" winding of resolver 80 is connected to the $b'$ winding of resolver 77. The rotor of resolver 80 is positioned in accordance with the angle $\theta_1$. The $a'$ output of resolver 80 is proportional to the X coordinate of the free end of the vector gage in accordance with Equation 1. This output signal can also be compensated for offset in the X-direction utilizing summing network 83 and potentiometer 84. The $b'$ output of resolver 80 is proportional to the Y coordinate of the free end of the vector gage in accordance with Equation 2. This output signal can be compensated for offset in the Y-direction utilizing summing network 85 and potentiometer 86. The wipers of potentiometers 84, 86 and 82 are preset to pick off signals proportional to the offset in the X, Y, and directions, respectively.

The invention has been described primarily, as to specific detailed elements, as arranged for employing analog type of angle measurement and resolutions. However, the invention is not limited thereto and does not exclude digital angle measurement, such as might be accomplished by a magnetic or photoelectric grid system in which the grid is graduated in trigonometric function of angles instead of linearly as for the link length measurements.

In the foregoing specification vector gages have been described with a pair of links adjustable in length and with fully flexible pivots. It will be understood, however, that the invention is not limited thereto and does not exclude, for example, vector gages constructed with one or both links of fixed lineal length and/or with a lesser number of angular degrees of freedom about pivot points 4 and 7. Such a gage would be considerably limited in its flexibility. The simplicity of design might in some cases and for some uses warrant the limitations on flexibility. Similarly, the flexible linkage system which is utilized to connect the reference point to the point on the workpiece can be constructed of three or more links pivotally connected in series with the free end of one end link pivotally supported at reference point 4 and the free end of the other end link placed against the workpiece at the proper point.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A vector gage comprising: a plurality of links having pivotal connections therebetween, at least one of said links having an adjustable length; length sensing means for measuring the length of said links which have an adjustable length and generating a signal which is a measure of said length; angle sensing means for measuring the angles between said links at each of said pivotal connections and generating signals which are measures of said angles; and computer means responsive to the output of said length sensing means and said angle sensing means to compute an output which indicates the location of a portion of one of the end links of said plurality of links with respect to a portion of the other of the end links of said plurality of links.

2. A flexible vector gage useful for providing an indication of the relative positions of two points comprising a flexible linkage sysem having a plurality of links pivotally connected in series, including an end link pivotally supported at one of said points; means for continuously generating signals proportional to the lengths and functions of the angular bearings of each of said links in said linkage system, the bearing of said end link being relative to a preselected fixed coordinate system and the bearing of the others of said links being relative to coordinate systems which are fixed relative to the next preceding link; and computer means responsive to said signals form said signal generating means in a manner to produce an output representative of the position of a portion of one of said series connected links relative to said one point.

3. A position indicating device for indicating the instantaneous position of a point relative to a preselected reference point and preselected reference coordinate axes comprising a plurality of links pivotally connected in series, including a first link having a free end pivotally supported at said reference point; means for continuously generating signal outputs proportional to a function of the angular bearing of said first link relative to said preselected reference coordinate axes; means for continuously generating signal outputs proportional to functions of the angular bearings between successive links of said series of links relative to each other; and computer means responsive to the outputs of said signal generating means in a manner to produce outputs representative of the position of a preselected point on the other end link of said series of links relative to said reference point.

4. A position indicating device useful for accurately indicating the position of a point relative to a preselected reference point comprising a first link pivotally supported at said reference point; a second link pivotally supported at a preselected pivot point on said first link, a preselected point on said second link being the point whose position is to be indicated; first means for generating signals proportional to coordinates of said preselected pivot point in a preselected coordinate system having an origin at said reference point; second means for generating signals proportional to coordinates of said preselected point on said second link relative to a preselected coordinate sysem having an origin at said pivot point between said first and second link and having a fixed position relative to said first link; and computer means subjected to the signals from said first and second signal generating means and having outputs proportional to the coordinates of the point to be indicated in said coordinate system having an origin at said reference point.

5. A position indicating device as recited in claim 4 in which at least one of said links has an adjustable length.

6. A position indicating device useful for accurately indicating the position of a point relative to a preselected reference point comprising a first link pivotally supported at said reference point; a second link pivotally supported at a preselected pivot point on said first link, a preselected point relative to said second link being said point whose position is to be indicated; means for generating signals proportional to the length of said first link between said reference point and said pivot point; means for generating signals proportional to the length of said second link between said pivot point and said preselected point; means for generating signals which are predetermined functions of the position angles of a line joining said reference point and said pivot point relative to a preselected reference coordinate system having an origin at said reference point; means for generating signals which are predetermined functions of the position angles of a line joining said pivot point and said preselected point relative to a preselected coordinate system having an origin at said pivot point and having a fixed positional relationship relative to said first link; and computer means subjected to the signals from all of said signal generating means in a manner to combine said signals in a predetermined fashion to produce signal outputs proportional to the position of said preselected point relative to said reference coordinate system.

7. A three dimension position indicating device useful for continuously indicating the position of a point on a surface relative to a preselected reference point, said indication being a coordinate indication relative to three preselected orthogonal reference axes comprising a first link of adjustable length pivotally supported by one end at said reference point; first signal generating means responsive to the angular displacement of said first link from a position of coincidence with one of said reference axes and having signal outputs which are predetermined functions of said angular displacement; second signal generating means responsive to the angular displacement of said first link from a preselected position relative to a second of said reference axes, said angular displacement being measured in the plane of the second and the third of said reference axes, and having signal outputs which are predetermined functions of said angular displacement; third signal generating means having a signal output proportional to the length of said first link measured between said reference point and a second pivot point on said first link; a second link of adjustable length pivotally supported by one end at said second pivot point of said first link; fourth signal generating means responsive to the angular displacement of said second link from a position of coincidence with an extension of the line joining said reference point and said second pivotal point and having signal outputs which are predetermined functions of said angular displacement; fifth signal generating means responsive to the angular displacement of said second link from a preselected position relative to a preselected line normal to said line extension at said second pivotal point, said angular displacement being measured in a plane normal to said extension line at said second pivotal point, and having signal outputs which are predetermined functions of said angular displacement; sixth signal generating means having a signal output proportional to the length of said second link measured between said second pivotal point and a preselected point on said second link; and computer means responsive to the signal outputs of said first, second, third, fourth, fifth and sixth signal generating means in a manner to produce signal outputs proportional to the coordinates of said preselected point on said second link along said three preselected orthogonal reference axes.

8. A vector gage comprising first and second pivotally interconnected links, said first link being pivoted to a reference support at a reference point, said second link adapted to have a portion thereof positioned at a point to be located relative to said reference point, means for generating signals representative of the lengths of said links, means for generating signals representative of the angular relations of said first link to said support and of said second link to said first link, and computer means responsive to said signals for producing an output representative of the position of said second link portion with respect to said reference point.

References Cited in the file of this patent

UNITED STATES PATENTS

| | | |
|---|---|---|
| 686,455 | Hill | Nov. 12, 1901 |
| 980,851 | Updegraff | Jan. 3, 1911 |
| 2,538,226 | Anderson et al. | Jan. 16, 1951 |
| 2,651,762 | Snow | Sept. 8, 1953 |
| 2,682,045 | Crost | June 22, 1954 |
| 2,689,083 | Hammond | Sept. 14, 1954 |
| 2,812,132 | Hauser | Nov. 5, 1957 |
| 2,886,892 | Banfill | May 19, 1959 |